H. SWAIN.
PUMP FOR AUTOMOBILE TIRES.
APPLICATION FILED AUG. 8, 1907.
938,522.
Patented Nov. 2, 1909.
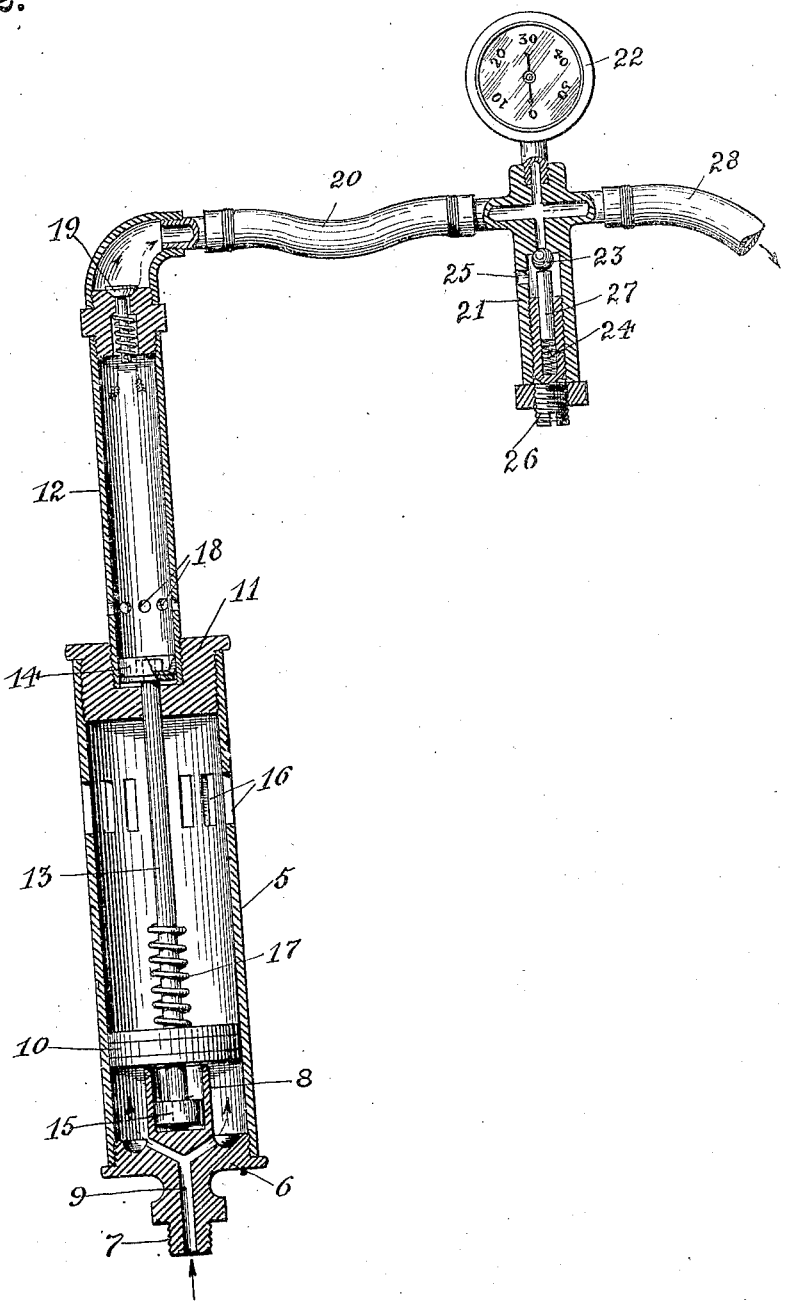

UNITED STATES PATENT OFFICE.

HADWEN SWAIN, OF SAN FRANCISCO, CALIFORNIA.

PUMP FOR AUTOMOBILE-TIRES.

938,522.

Specification of Letters Patent.　　Patented Nov. 2, 1909.

Application filed August 8, 1907. Serial No. 387,643.

*To all whom it may concern:*

Be it known that I, HADWEN SWAIN, a citizen of the United States, residing in the city and county of San Francisco, State of California, have invented new and useful Improvements in Pumps for Automobile-Tires, of which the following is a specification.

In inflating automobile tires it is a common practice to use an air pump operated by hand which is connected to the inner tube of the auto tire by a hose for inflating the inner tube of the tire.

My invention relates to pumps for inflating the inner tube of an automobile tire on those cars which are driven by multiple cylinder engines, and the object thereof is to provide simple and inexpensive mechanism which can be connected to the inner tube and to one of the cylinders of the engine without any explosion taking place therein for pumping the necessary air required to inflate the tire, the pumping cylinder being operated by the other cylinders of the engine.

I accomplish this object by the mechanism described herein and illustrated in the accompanying drawing which is a longitudinal, central section of the mechanism for forcing the air into the tire and a central section of the safety valve mechanism.

In the drawings 5 is the motor cylinder of my tire inflating mechanism. 6 is the lower head of said cylinder, the lower end 7 of which is screw threaded so that it can be screwed into the spark plug opening of an explosion engine. Within the cylinder the lower head is provided with an upwardly extending cup 8 which forms one member of a dash pot.

9 is a channel which leads through the head, and is preferably forked so as to extend outside the cup.

10 is a piston which works in cylinder 5.

11 is the upper head of cylinder 5 in which is centrally screwed cylinder 12 which is the smaller pump cylinder of my tire inflating mechanism. Piston 10 is provided with a stem 13 which extends through head 11 and into cylinder 12, and within said cylinder there is secured to said stem a piston 14 which has a working fit in cylinder 12. Stem 13 also extends a short distance below piston 10 and on the lower end thereof there is secured a small piston 15 which has a working fit in cup 8 and forms the other member of the dash pot. Near the upper end of cylinder 5 are ports 16 which are near the upper limit of the travel of piston 10 in cylinder 5. A coil spring 17 surrounds stem 13 just above the piston to prevent the piston striking the upper head with a jar and also to assist the piston in moving downwardly to close ports 16 upon the inflation of the cylinder with which it is connected. Near its connection with head 11 cylinder 12 is provided with inlet ports 18, which are preferably just above the downward limit of movement of piston 14. A supply of air is admitted into cylinder 12 through the ports. In the upper end of cylinder 12 is an outwardly opening check valve 19. The extreme outer end of chamber 12 is connected by hose 20 to the relief valve chamber casing 21. In one end of said casing is the pressure gage 22 and in the other end is a relief valve 23 which is regulated to open at a certain definite pressure which pressure is controlled by spring 24. When the tension of spring 24 is overcome, valve 23 leaves its seat and air escapes through port 25. Any other form of relief valve may be used. The tension of spring 24 is regulated by nut 26 which is screwed into the relief valve casing. A plunger stem 27 is preferably provided intermediate spring 24 and valve 23, but the same could be omitted if desired. Hose 28 connects the relief valve casing with the valve of the automobile tire.

It will be observed that my tire inflating mechanism consists of two connected pump chambers one of which is the pump motor cylinder and is larger than the other, each of which is provided with a piston, and that the pistons of the two chambers are connected by a stem and that the pistons move together. This construction is necessary because in many explosion engines used in automobiles the power of the piston in the cylinder is not sufficient to produce the necessary air pressure for the tires.

Another object of this construction is that in the utilization of a cylinder of the explosion engine, if the direct pressure was used from such cylinder to force air into the tire it would enter said tire laden with gasolene vapor which is objectionable. By connecting the smaller pump chamber with the tire and by utilizing the power of the pump cylinder to operate the piston of the larger chamber, I am able to inflate the tires with pure air and can also utilize a lower power engine to inflate the tires to a higher pressure than the engine power.

Having described my invention what I claim is:

1. A device for inflating automobile tires comprising two connected cylinders, one of which is larger than the other, said smaller cylinder having ports in the wall thereof near its connection with the larger cylinder; pistons in said cylinders connected by a stem; a connection from the upper end of the smaller cylinder to the automobile tire; and means to connect the lower end of the larger cylinder into the spark plug opening of one of the cylinders of a multiple cylinder engine, said connecting means having a channel extending therethrough opening into the larger cylinder.

2. A device for inflating automobile tires comprising two connected cylinders in alinement, one of which is larger than the other, said cylinders having ports in the walls thereof near their connection with each other; pistons in said cylinders connected by a stem; a connection from the upper end of the small cylinder to the automobile tire; and means to connect the lower end of the larger cylinder into the spark plug opening of one of the cylinders of a multiple cylinder engine, said connecting means having a channel extending therethrough opening into the lower end of the larger cylinder.

3. A device for inflating automobile tires comprising two connected cylinders one of which is larger than the other, said cylinders having ports in the walls thereof near their connection with each other; pistons in said cylinders connected by a stem; an outwardly opening check valve in the upper end of the smaller cylinder; a connection from the upper end of the smaller cylinder to the automobile tire; a relief valve on said connection; and means to connect the lower end of the larger cylinder into the spark plug opening of one of the cylinders of a multiple cylinder engine, said connecting means having a channel extending therethrough opening into the lower end of the larger cylinder.

4. A device for inflating automobile tires comprising two connected cylinders in alinement one of which is larger than the other, said cylinders having ports in the walls thereof near their connection with each other; pistons in said cylinders; a stem connecting said pistons; a spiral spring around said stem within the larger cylinder; an outwardly opening check valve in the upper end of the smaller cylinder; a connection from the upper end of the smaller cylinder to the automobile tire; a relief valve on said connection; a pressure gage on said connection; a dash pot within the larger cylinder one portion of which is carried by the piston and the other by the cylinder head; and means to connect the lower end of the larger cylinder into the spark plug opening of one of the cylinders of a multiple engine, said connecting means having a channel extending therethrough opening into the lower end of the larger cylinder.

HADWEN SWAIN.

Witnesses:
ALANSON SWAIN,
W. T. GORHAM.